(12) United States Patent
Cen et al.

(10) Patent No.: US 11,338,483 B2
(45) Date of Patent: May 24, 2022

(54) PASSIVE HORN INTEGRALLY FORMED BY USING THERMOPLASTIC VULCANIZED RUBBER AND PREPARATION METHOD THEREOF

(71) Applicant: Tymphany Acoustic Technology (Huizhou) Co., Ltd., Huizhou (CN)

(72) Inventors: Shuhong Cen, Huizhou (CN); Cheng Ho, Huizhou (CN)

(73) Assignee: TYMPHANY ACOUSTIC TECHNOLOGY (HUIZHOU) CO., LTD., Huizhou (CN)

( * ) Notice: Subject to any disclaimer, the term of this patent is extended or adjusted under 35 U.S.C. 154(b) by 370 days.

(21) Appl. No.: 16/405,622

(22) Filed: May 7, 2019

(65) Prior Publication Data

US 2019/0337203 A1  Nov. 7, 2019

(30) Foreign Application Priority Data

May 7, 2018  (CN) .......................... 201810428190.5

(51) Int. Cl.
  *B29C 45/16* (2006.01)
  *B29C 45/14* (2006.01)
  (Continued)

(52) U.S. Cl.
  CPC .. *B29C 45/14418* (2013.01); *B29C 45/14065* (2013.01); *B29C 45/14475* (2013.01);
  (Continued)

(58) Field of Classification Search
  CPC ......... B29L 2031/3418; B29L 2031/38; B29C 45/14418; B29C 45/14065;
  (Continued)

(56) References Cited

U.S. PATENT DOCUMENTS

| 6,224,801 B1 * | 5/2001 | Mango, III | ....... B29C 45/14336 264/154 |
| 2014/0355806 A1 * | 12/2014 | Graff | ........................ H04R 1/02 381/334 |

(Continued)

OTHER PUBLICATIONS

English abstract of CN107948892 (Year: 2018).*

*Primary Examiner* — Jeffrey M Wollschlager
*Assistant Examiner* — Xue H Liu
(74) *Attorney, Agent, or Firm* — Muncy, Geissler, Olds & Lowe, P.C.

(57) ABSTRACT

A passive horn integrally formed using thermoplastic vulcanized rubber includes a first outer casing, a second outer casing, an inner casing and an iron piece. The first outer casing includes a sealing ring, a folding ring and a vibrating membrane, and the sealing ring, the folding ring and the vibrating membrane are integrally injection molded into the first outer casing. A groove is disposed in the second outer casing, and the first outer casing is disposed in the groove. The back surface of the vibrating membrane is provided with a casing groove sequentially embedded with the inner casing and the iron piece. Furthermore, a preparation method of a passive horn integrally formed using thermoplastic vulcanized rubber, which, under the condition of integrated injection molding, may improve the yield rate, ensure product quality, save assembly time and labor cost, and improve production efficiency.

6 Claims, 5 Drawing Sheets

(51) Int. Cl.
  *B29C 45/17* (2006.01)
  *B29C 45/72* (2006.01)
  *B29K 21/00* (2006.01)
  *B29K 23/00* (2006.01)
  *B29K 309/08* (2006.01)
  *B29L 31/34* (2006.01)

(52) U.S. Cl.
  CPC .......... *B29C 45/16* (2013.01); *B29C 45/1706* (2013.01); *B29C 45/7207* (2013.01); *B29C 2045/1707* (2013.01); *B29K 2021/003* (2013.01); *B29K 2023/12* (2013.01); *B29K 2309/08* (2013.01); *B29L 2031/3418* (2013.01)

(58) Field of Classification Search
  CPC .............. B29C 45/14475; B29C 45/16; B29C 45/1706; B29C 45/7207; B29C 45/1671; B29C 45/14819; B29C 45/1676; B29C 45/1673; B29C 2045/1707; B29K 2021/003; B29K 2023/12; B29K 2309/08; B29K 2705/12
  USPC ........................................................ 264/260
  See application file for complete search history.

(56) References Cited

U.S. PATENT DOCUMENTS

| | | | |
|---|---|---|---|
| 2016/0309272 A1* | 10/2016 | Wang | H04R 9/06 |
| 2016/0316298 A1* | 10/2016 | Ohura | H04R 1/2834 |
| 2018/0124504 A1* | 5/2018 | Jeffery | H04R 1/025 |
| 2018/0310082 A1* | 10/2018 | Amae | H04R 1/021 |

\* cited by examiner

PASSIVE HORN INTEGRALLY FORMED BY USING THERMOPLASTIC VULCANIZED RUBBER AND PREPARATION METHOD THEREOF

CROSS REFERENCE TO RELATED APPLICATIONS

This application claims priority of Application No. CN 201810428190.5 filed in China on May 7, 2018 under 35 U.S.C. § 119, the entire contents of all of which are hereby incorporated by reference.

TECHNICAL FIELD

The present invention relates to a horn, in particular, to a passive horn integrally formed by using thermoplastic vulcanized rubber and a preparation method thereof.

BACKGROUND

At present, the traditional preparation process of passive horns used in the industry is: the hard rubber shell, the folding ring, the iron piece and the like of the sound are separately processed, and then subjected to surface treatment, glue coating, lamination, compaction and the like.

This multi-step processing method has low production efficiency and low yield of finished products. The folding ring is thermoformed using a thermosetting rubber material, and the scrap cannot be reused, resulting in waste. The volatiles in the surface treatment and adhesive-coating process are prone to environmental pollution, and manual bonding often causes the boundary lines to be uneven and affect the appearance of the product.

SUMMARY

In order to solve the above problems existing in the prior art, the present invention provides a passive horn integrally formed by using thermoplastic vulcanized rubber and a preparation method thereof.

To achieve the above object, the present invention provides the following technical solution.

A passive horn integrally formed by using thermoplastic vulcanized rubber, includes a first outer casing, a second outer casing, an inner casing and an iron piece; the first outer casing includes a sealing ring, a folding ring and a vibrating membrane, and the sealing ring, the folding ring and the vibrating membrane are integrally injection molded into the first outer casing; a groove is disposed in the second outer casing, and the first outer casing is disposed in the groove; the back surface of the vibrating membrane is provided with a casing groove, and the casing groove is sequentially embedded with the inner casing and the iron piece.

Further, the cross section of the inner casing is a T-shaped structure, and the cross section of the iron piece is an inverted T-shaped structure, the T-shaped structure cooperating with the inverted T-shaped structure.

Further, the iron piece is provided with two positioning holes.

Further, the positioning hole is shaped as a strip hole or a round hole.

The present invention further provides a preparation method of above passive horn integrally formed by using thermoplastic vulcanized rubber, including:

positioning an iron piece in a mold by means of a positioning hole;

injecting a molten plastic raw material into the mold while injection-molding a first outer casing, a second outer casing and wrapping an inner casing with an iron piece to form an integral structure, wherein the first outer casing is formed by integrally injection-molding with a sealing ring, a folding ring and a vibrating membrane;

after completing the injection-molding, adding water to cool to mold the product, then completing releasing of the mold after ejection.

Among them, the molten plastic raw material may also be injected into the mold in the form of encapsulation, the second outer casing is injection-molded first and the inner casing is wrapped with the iron piece, and then the first outer casing is injection-molded, so as to form an integral structure, wherein the first outer casing is formed by integrally injection-molding with the sealing ring, the folding ring and the vibrating membrane.

Further, the material of the first outer casing is a thermoplastic vulcanized rubber.

Further, the material of the second outer casing and the inner casing is a composite material of PP and glass fiber.

Further, the temperature of the injection molding is 180-350 degrees Celsius, and the pressure of the injection molding is 40-200 MPa.

Based on the above technical solutions, the technical effects obtained by the present invention are:

(1) In the passive horn integrally formed by using thermoplastic vulcanized rubber provided by the present invention, the sealing ring, the folding ring and the vibrating membrane are injection-molded into an integral structure by using an integral injection-molding process, wherein the injection-molding process is easy to implement and the package is stable, so that the structure is simple, the sealing effect is good, the structure is firm, the appearance is perfect, and there is no bonding line.

(2) In the passive horn integrally formed by using thermoplastic vulcanized rubber provided by the present invention, under the condition of integral injection-molding, the product quality is guaranteed, the assembly time and labor cost are saved, and the production efficiency is improved.

Figure 1:
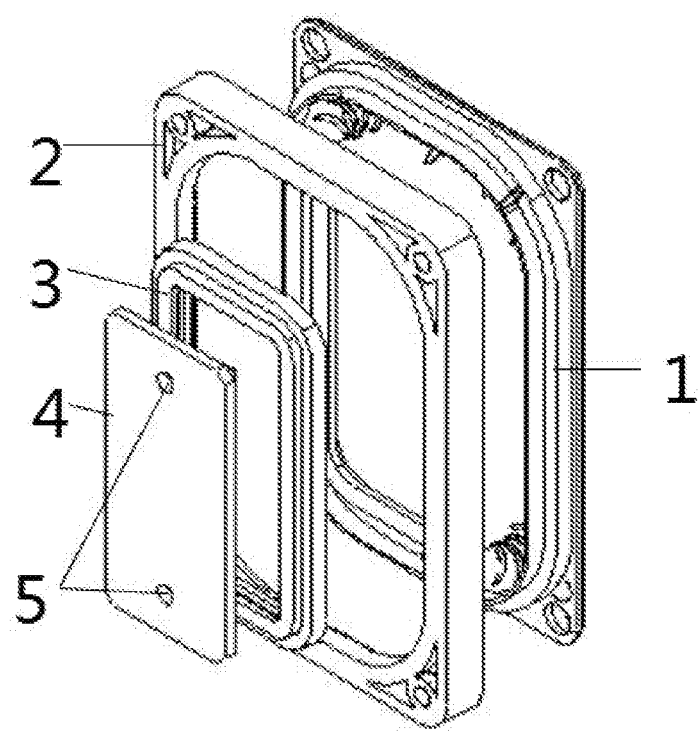
FIG. 1 is an exploded view of the passive horn integrally formed by using thermoplastic vulcanized rubber according to the present invention.
Figure 2:
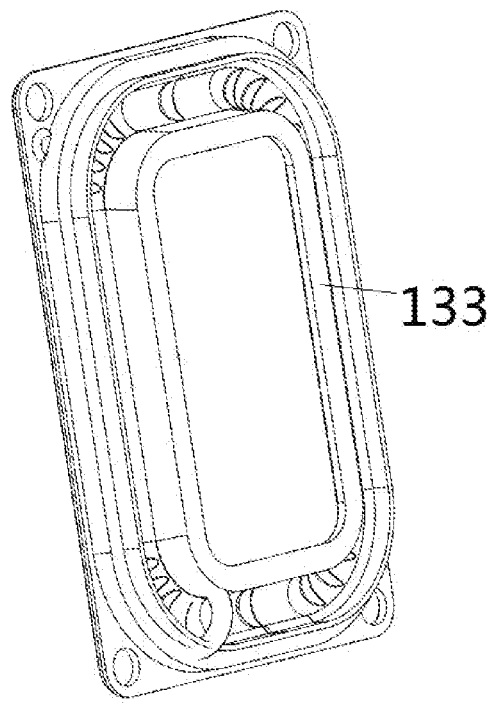
FIG. 2 is a perspective view of the first outer casing according to the present invention.
Figure 3:
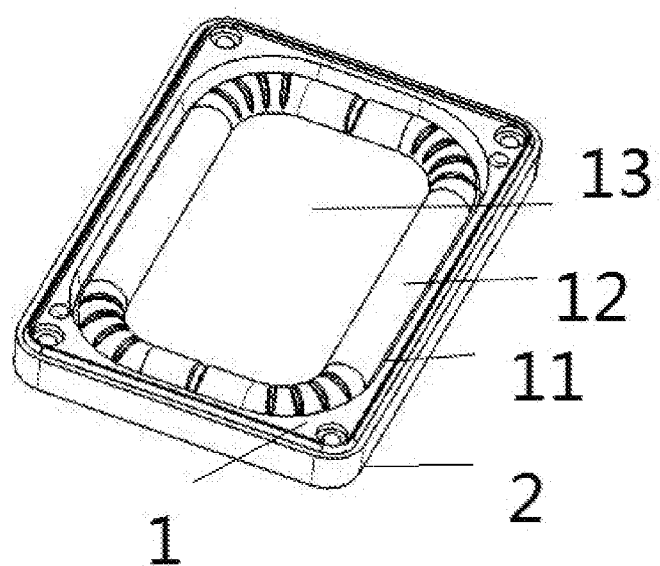
FIG. 3 is an overall view of the passive horn integrally formed by using thermoplastic vulcanized rubber according to the present invention.
Figure 4:
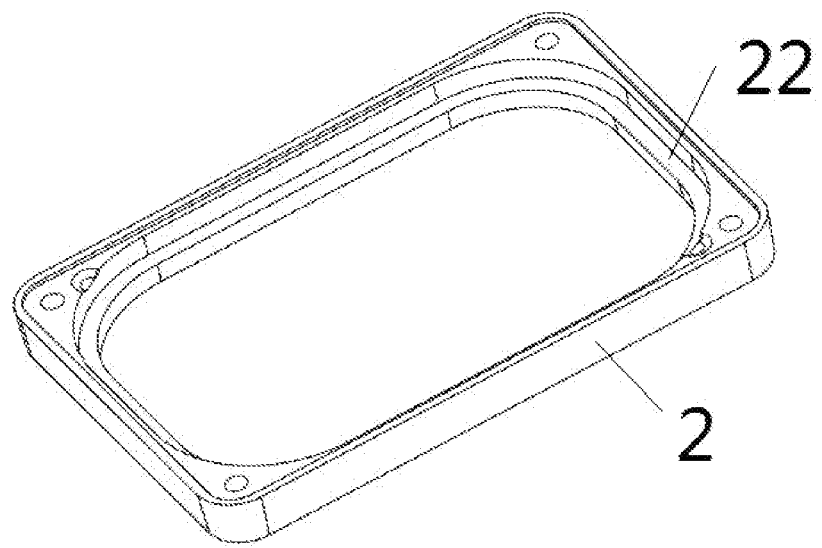
FIG. 4 is a perspective view of the second outer casing according to the present invention.
Figure 5:
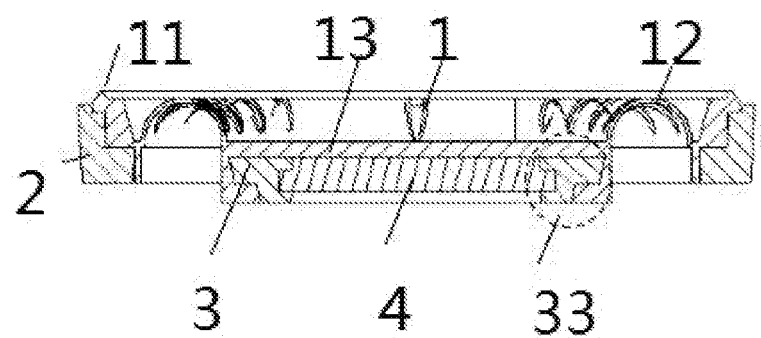
FIG. 5 is a cross-sectional view of the passive horn integrally formed by using thermoplastic vulcanized rubber according to the present invention.

Among those, the reference numerals are as follows:
1 first outer casing
2 second outer casing 3 inner casing
4 iron piece
5 positioning hole
11 sealing ring
12 folding ring
13 vibrating membrane
133 casing groove
22 groove
33 T-shaped structure

DETAILED DESCRIPTION

The present invention will be described more fully hereinafter with reference to the accompanying drawings and specific embodiments. Preferred embodiments of the present invention are given in the drawings. However, the present invention may be embodied in many different forms and is not limited to the embodiments described herein. Rather, these embodiments are provided so that the disclosure will be more fully understood.

It should be noted that when an element is referred to as being "fixed" to another element, it can be directly on the other element or a centered element can be present. When an element is considered to be "connected" to another element, it can be directly connected to a centered element can be present simultaneously.

For ease of reading, the terms "upper", "lower", "left", and "right" are used in the drawings to indicate the relative position of the reference between the elements, and not to limit the present application.

All technical and scientific terms used herein have the same meaning as commonly understood by one of ordinary skill in the art to which this invention belongs, unless otherwise defined. The term used in the description of the present invention is for the purpose of describing specific embodiments and is not intended to limit the present invention.

Embodiment 1

As shown in FIGS. 1 to 5, a passive horn integrally formed by using thermoplastic vulcanized rubber comprises a first outer casing 1, a second outer casing 2, an inner casing 3 and an iron piece 4; the first outer casing 1 includes a sealing ring 11, a folding ring 12 and a vibrating membrane 13, and the sealing ring 11, the folding ring 12 and the vibrating membrane 13 are integrally injection molded into the first outer casing 1; a groove 22 is disposed in the second outer casing 2, and the first outer casing 1 is disposed in the groove 22; the back surface of the vibrating membrane 13 is provided with a casing groove 133, and the casing groove 133 is sequentially embedded with the inner casing 3 and the iron piece 4.

The cross section of the inner casing 3 is a T-shaped structure 33, and the cross section of the iron piece 4 is an inverted T-shaped structure, the T-shaped structure cooperating with the inverted T-shaped structure, so that the tightness of the inner casing 3 and the iron piece 4 may be enhanced, and the connection between the two may be ensured to be firm and stable.

The iron piece 4 is provided with 2 positioning holes 5, and the positioning hole 5 is shaped as a strip hole or a round hole.

In the present embodiment, the sealing ring, the folding ring and the vibrating membrane are injection-molded into an integral structure by using an integral injection-molding process, wherein the injection-molding process is easy to implement and the package is stable, so that the structure is simple, the sealing effect is good, the structure is firm, the appearance is perfect, and there is no bonding line.

And, under the condition of integral injection-molding, the product quality is guaranteed, the assembly time and labor cost are saved, and the production efficiency is improved.

Embodiment 2

Figure 6:
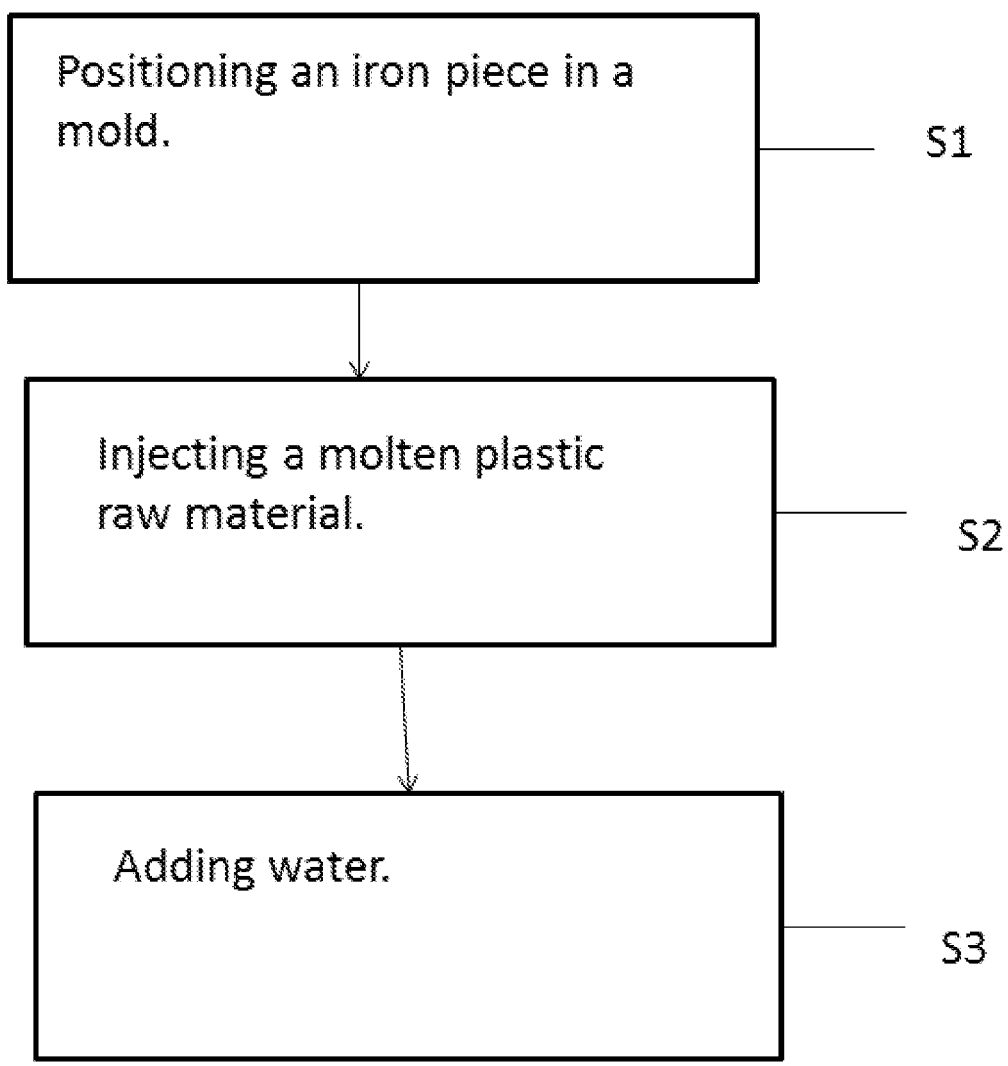
FIG. 6 illustrates a preparation method of above passive horn integrally formed by using thermoplastic vulcanized rubber according to an exemplary embodiment of the invention.
Figure 7:
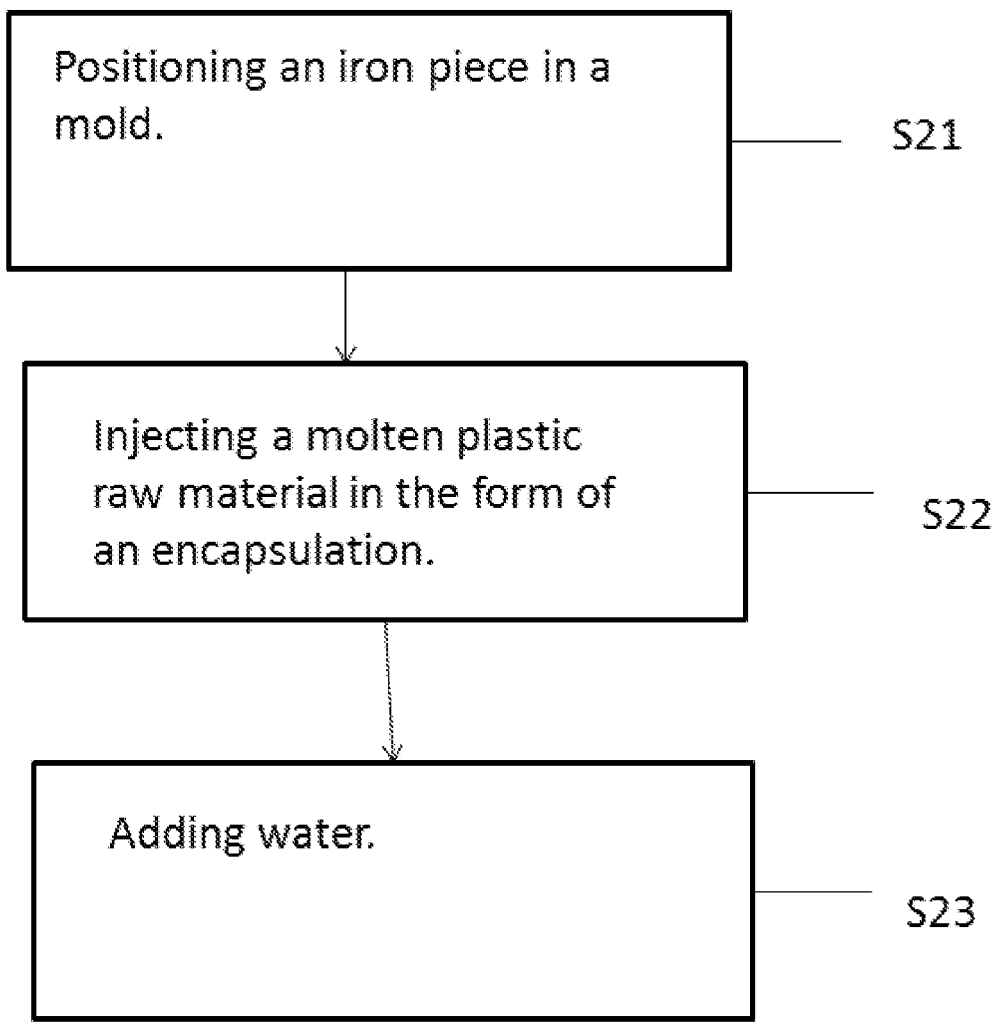
FIG. 7 illustrates a preparation method of above passive horn integrally formed by using thermoplastic vulcanized rubber according to another exemplary embodiment of the invention.

A preparation method of above passive horn integrally formed by using thermoplastic vulcanized rubber is illustrated in FIG. 6 and includes:

S1, positioning an iron piece in a mold by means of a positioning hole;

S2, injecting a molten plastic raw material into the mold while injection-molding a first outer casing, a second outer casing and wrapping an inner casing with an iron piece to form an integral structure, wherein the first outer casing is formed by integrally injection-molding with a sealing ring, a folding ring and a vibrating membrane;

S3, after completing the injection-molding, adding water to cool to mold the product, then completing releasing of the mold after ejection. Among them, the temperature of the injection molding is 180-350 degrees Celsius, and the pressure of the injection molding is 40-200 MPa.

In the present embodiment, a two-color injection-molding machine is used to simultaneously injection-mold the first outer casing, the second outer casing and the inner casing iron piece through two sets of two-color injection-molding molds, that is, forming with one-time injection-molding to realize product production.

In the present embodiment, in step S2, the first outer casing is a thermoplastic vulcanized rubber, which has the characteristics of good weather resistance, wear resistance, good elasticity and compression deformation resistance of the thermoset rubber, and excellent processing properties of the thermoplastic plastic, and may be injection-molded. The second outer casing and the inner casing is a composite material of PP and glass fiber, which ensures the high strength of the passive horn produced. The composites of the thermoplastic vulcanized rubber, PP and glass fiber have good adhesion under injection-molding conditions, and the integrally injection-molding may be performed.

Embodiment 3

A preparation method of above passive horn integrally formed by using thermoplastic vulcanized rubber is illustrated in FIG. 6 and includes: S21, positioning an iron piece in a mold by means of a positioning hole;

S22, the molten plastic raw material may be injected into the mold in the form of encapsulation, the second outer casing is injection-molded first and the inner casing is wrapped with the iron piece, and then the first outer casing is injection-molded, so as to form an integral structure, wherein the first outer casing is formed by integrally injection-molding with the sealing ring, the folding ring and the vibrating membrane.

S23, after completing the injection-molding, adding water to cool to mold the product, then completing releasing of the mold after ejection. Among them, the temperature of the injection molding is 180-350 degrees Celsius, and the pressure of the injection molding is 40-200 MPa.

In the present embodiment, using a conventional injection-molding machine, i.e. a horizontal injection-molding machine or a vertical injection-molding machine, the second outer casing and the inner casing iron piece are injection-molded in the first set of molds, then the second outer casing and the inner casing iron piece are placed into the second set of molds to injection-mold the first outer casing to form an integral structure, so that after two sets of molds are placed on two conventional injection-molding machines, the product is produced by two injection-moldings.

In the present embodiment, in step S22, the first outer casing is a thermoplastic vulcanized rubber, which has the characteristics of good weather resistance, wear resistance, good elasticity and compression deformation resistance of the thermoset rubber, and excellent processing properties of the thermoplastic plastic, and may be injection-molded. The second outer casing and the inner casing is a composite material of PP and glass fiber, which ensures the high strength of the passive horn produced. The composites of the thermoplastic vulcanized rubber, PP and glass fiber have good adhesion under injection-molding conditions, and the integrally injection-molding may be performed.

For the preparation method of above passive horn integrally formed by using thermoplastic vulcanized rubber provided by the present embodiment, the sealing ring, the folding ring and the vibrating membrane are injection-molded into an integral structure by using an integral injection-molding process for realizing fully automated production. Under the condition of integral injection-molding, the product quality is guaranteed, the assembly time and labor cost are saved, and the production efficiency is improved.

The above description is only examples and illustrative of the structure of the present invention, and the description thereof is more specific and detailed, but is not to be construed as limiting the scope of the present invention. It should be noted that it will be apparent to those skilled in the art that various modifications and improvements can be made without departing from the spirit and scope of the present invention. These obvious alternatives are all within the scope of the present invention.

The invention claimed is:

1. A preparation method of a passive horn integrally formed by using thermoplastic vulcanized rubber, the method comprising:

positioning an iron piece in a mold by means of a positioning hole;

injecting a molten plastic raw material into the mold while injection-molding a first outer casing, a second outer casing and wrapping an inner casing with the iron piece to form an integral structure, wherein the first outer casing is formed by integrally injection-molding with a sealing ring, a folding ring and a vibrating membrane; and after completing the injection-molding, adding water to cool to mold the passive horn, then completing releasing of the mold after ejection.

2. The preparation method according to claim 1, wherein, during said injecting, the molten plastic raw material is injected into the mold in the form of encapsulation, the second outer casing are injection-molded first and the inner casing is wrapped with the iron piece, and then the first outer casing is injection-molded, so as to form an integral structure, wherein the first outer casing is formed by integrally injection-molding with the sealing ring, the folding ring and the vibrating membrane.

3. The preparation method according to claim 1, wherein during said injecting, the material of the first outer casing is a thermoplastic vulcanized rubber.

4. The preparation method according to claim 1, wherein during said injecting, the material of the second outer casing and the inner casing is a composite material of PP and glass fiber.

5. The preparation method according to claim 1, wherein, during said adding water, a temperature of the injection molding is 180-350 degrees Celsius, and a pressure of the injection molding is 40-200 MPa.

6. The preparation method according to claim 2, wherein, during said injecting, the second outer casing and inner casing iron piece are injection-molded in a first set of molds, then the second outer casing, the inner casing and the iron piece are placed into a second set of molds to injection-mold the first outer casing to form the integral structure.

* * * * *